(12) United States Patent
Prasky et al.

(10) Patent No.: US 9,086,886 B2
(45) Date of Patent: Jul. 21, 2015

(54) METHOD AND APPARATUS TO LIMIT MILLICODE ROUTINE END BRANCH PREDICTION

(75) Inventors: Brian R. Prasky, Wappingers Falls, NY (US); James J. Bonanno, Wappingers Falls, NY (US); Lisa C. Heller, Rhineback, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1200 days.

(21) Appl. No.: 12/821,690

(22) Filed: Jun. 23, 2010

(65) Prior Publication Data

US 2011/0320791 A1   Dec. 29, 2011

(51) Int. Cl.
*G06F 9/30*   (2006.01)
*G06F 9/38*   (2006.01)

(52) U.S. Cl.
CPC ............ *G06F 9/3806* (2013.01); *G06F 9/3017* (2013.01)

(58) Field of Classification Search
None
See application file for complete search history.

(56) References Cited

U.S. PATENT DOCUMENTS

| | | | |
|---|---|---|---|
| 6,055,623 A * | 4/2000 | Webb et al. | 712/208 |
| 6,055,624 A | 4/2000 | Webb et al. | |
| 6,125,444 A | 9/2000 | Check et al. | |
| 2005/0216713 A1 | 9/2005 | Prasky et al. | |
| 2009/0217002 A1 * | 8/2009 | Bonanno et al. | 712/205 |
| 2009/0217016 A1 * | 8/2009 | Bonanno et al. | 712/240 |

OTHER PUBLICATIONS

Northrop et al.; "A Semi-Custom Design Flow in High-Perfomrance Microprocessor Design"; ACM Digital Library; pp. 426-436; Jun. 2001.
Moreto et al., "FlexDCP: A QoS Framework for CMP Architectures", ACM Digital Library, Apr. 2010, pp. 86-96.
Liles et al., "Branch Prediction Mechanism", ip.com/ibm TDB, Dec. 1979, pp. 1-3.
Sarangi et al., "Phoenix: Detecting and Recovering from Permanent Processor Design Bugs with Programmable Hardware". ACM Digital Library/IEEE. Sep. 2006, pp. 1-12.

* cited by examiner

*Primary Examiner* — William B Partridge
(74) *Attorney, Agent, or Firm* — Margaret McNamara, Esq.; Blanche E. Schiller, Esq.; Heslin Rothenberg Farley & Mesiti P.C.

(57) ABSTRACT

A computing system method, program and hardware for correlation of millicode predictions with specific millicode routines receives architected millicode and stores the millicode in internal memory. The computer systems processors' pipeline is employed to predict and select a branch target buffer's (BTB) target address. A computer millicode control enabling an operating system (O/S) multi-task control between multiple user programs able to use millicode routines and ensuring that the programs do not interfere with each other, by use of a branch target buffer (BTB) prediction of a branch target to ensure that a millicode routine does not fetch outside of said millicode routine while performing operations as required by said millicode routing, said branch target buffer prediction employing a correlation mechanism for predicting millicoded branch millicode entry and millicode end instructions and for correlating millicode end predictions with specific millicode routines.

20 Claims, 5 Drawing Sheets

METHOD AND APPARATUS TO LIMIT MILLICODE ROUTINE END BRANCH PREDICTION

BACKGROUND OF THE INVENTION

1. Field of the Invention

This invention relates to a method and system apparatus, and in particular to a control to limit millicode routing end branch prediction.

2. Description of Background

Prior work includes applications assigned to IBM which include:

U.S. Published Patent Application US20090217002A1: SYSTEM AND METHOD FOR PROVIDING ASYNCHRONOUS DYNAMIC MILLICODE ENTRY PREDICTION, filed by James J. Bonanno, et al. on Feb. 21, 2008, which relates to: a system and method for asynchronous dynamic millicode entry prediction in a processor are provided. The system includes a branch target buffer (BTB) to hold branch information. The branch information includes: a branch type indicating that the branch represents a millicode entry (mcentry) instruction targeting a millicode subroutine, and an instruction length code (ILC) associated with the mcentry instruction. The system also includes search logic to perform a method. The method includes locating a branch address in the BTB for the mcentry instruction targeting the millicode subroutine, and determining a return address to return from the millicode subroutine as a function of the instruction address of the mcentry instruction and the ILC. The system further includes instruction fetch controls to fetch instructions of the millicode subroutine asynchronous to the search logic. The search logic may also operate asynchronous with respect to an instruction decode unit; and U.S. Published Patent Application US20090217016A1: SYSTEM AND METHOD FOR SEARCH AREA CONFINED BRANCH PREDICTION, filed by James J. Bonanno et al., Feb. 22, 2008, which relates to a system and method for performing search area confined branch prediction in a processor. The system includes a branch target buffer (BTB) to hold branch information for branch prediction, where the branch information includes a branch address. The system also includes search logic for searching the BTB to locate a branch address. The system additionally includes throttle logic to stop searching the BTB in response to reaching a predefined search limit.

SUMMARY OF THE INVENTION

The current invention implements the prior work and addresses the problem within millicode that still exists as operating system (O/S) multi-task control between multiple user programs able to use millicode routines must ensure that the programs do not interfere with each other, i.e. that there can be subroutine calls and this can yield a mcend prediction that is desired in some cases but can not be supported in other cases. Our solution in this exemplary embodiment for this problem is to correlate mcend predictions with specific millicode routines. Thus we limit millicode routine end branch prediction to ensure a millicode routine does not fetch beyond millicode end outside of its current routine.

Our computer millicode control enables an operating system (O/S) to have multi-task control between multiple user programs which are able to use millicode routines and ensures that the programs do not interfere with each other, by use of a branch target buffer (BTB) prediction of a branch target to ensure that a millicode routine does not fetch beyond millicode end outside of said millicode routine while performing operations as required by said millicode routing, said branch target buffer prediction employing a correlation mechanism for predicting millicoded branch millicode entry and millicode end instructions and for correlating millicode end predictions with specific millicode routines.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution which provides a method for fault injection verification as a computer process without manual intervention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
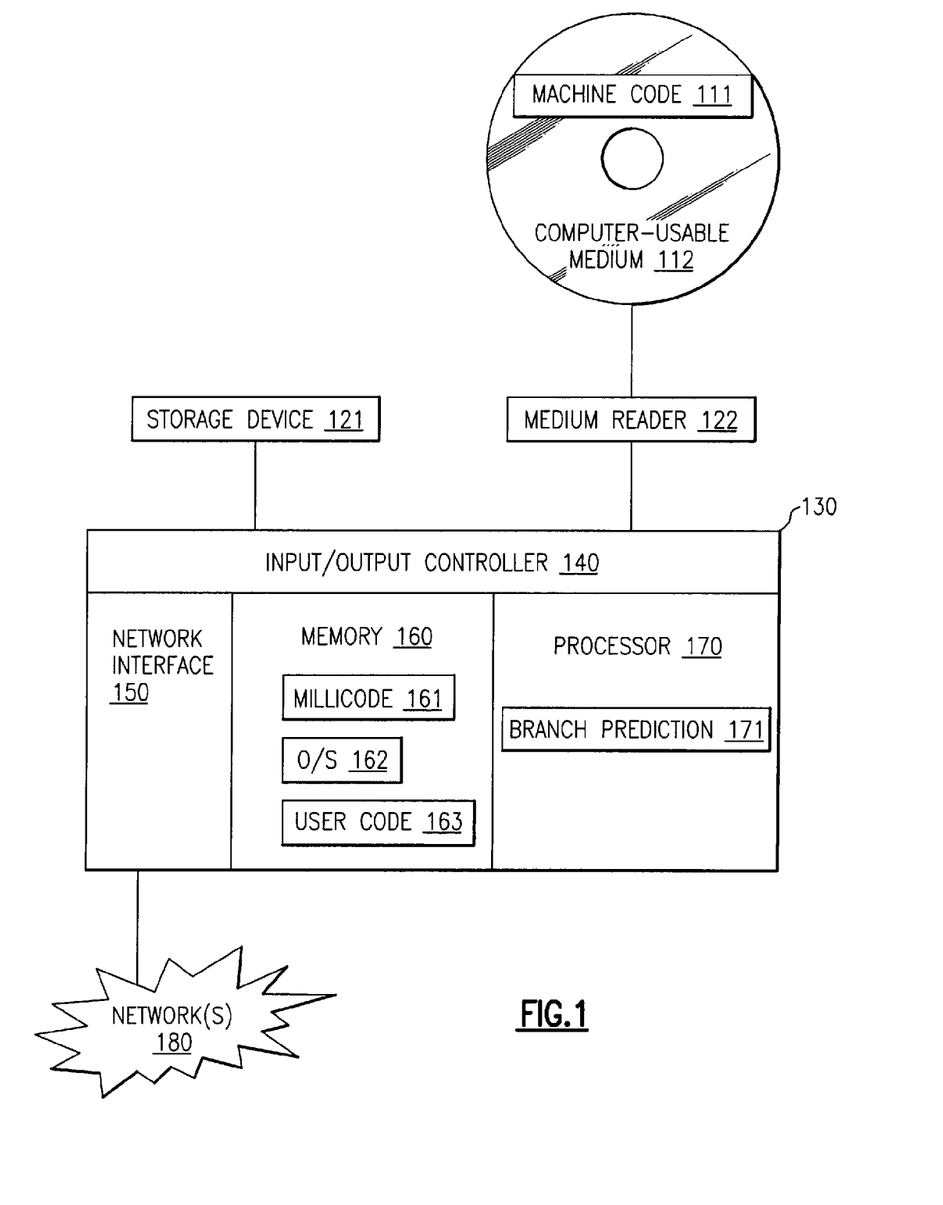
FIG. 1 illustrates the high level of the computing system and its hardware for correlation of millicode predictions with specific millicode routines.

Turning now to the drawings in greater detail, it will be appreciated that in FIG. 1 there is illustrated the hardware which provides for correlation of millicode predictions with specific millicode routines.

FIG. 1 shows the high level of the computing system and its hardware. The computer itself is denoted by 130 for correlation of millicode predictions with specific millicode routines.

Within this computing system (130) there is an input/output controller (140) which communicates with the storage devices (121), drives and interfaces (122) for reading user data medium (112) which contains code and data (111). The computing system can also acquire content from a network (180) via the network interface (150). This content which is acquired directly from and code disk or via the network interface is stored in local memory (160) and the milicode is so transferred, usually in the form of occasional updates, for use of the computing system during operation. Beyond user data, there is significant code required to make the computer and user program run. There is the internal millicode (161). The millicode is part of the architected instructions. A complex instruction is defined as a single instruction to the programmer; however, there is internally licensed code which breaks one complex instruction into many less complex instructions. The purpose of millicode is two fold. Having full control over the hardware, it contains algorithms that have been designed and tested specifically for the machine. These algorithms with the control they have over the system could crash a system if not done correctly. It is for this reason that a complex instruction is provided to the user and the "delicates" are handled within the tested millicode routine. It is with this level of control that derives the second reason. This control allows certain operations to be performed faster than what a programmer on the system can accomplish because of the control difference the IBM millicode (know as licensed internal millicode or LIC) has over an end user. The operating system (O/S) (162) specifically relies on millicode internal control as the O/S multi-task control between multiple user programs (163) and must ensure that the programs do not interfere with each other. These levels of software (162, 163) run on the processor (170). When running a program, there are many decision points/branches that are encountered in the program. On average, such a decision is to be made every 4 to 5 instructions. If the program had to wait for each branch to be resolved prior to making future progress the computing systems would run slow as there would be minimal opportunity to overlap the processing of multiple instructions. To allow the overlapping of instructions, branches are predicted (171) as to what their outcome will be such that the processor does not stall waiting for the outcome of a branch.

In a "complex" architecture there can be the complex instructions, which perform a series of less complex operations under LIC to provide one complex instruction available for a programmer to use. In IBM's z/Architecture® this is known as millicode. The millicode instructions under LIC have ways to alter the state of the machine which are not present to the programmer because improper updates of such facilities can yield data corruption and/or machine hangs.

When executing a millicode routine, one object is to do the routine as quickly as possible. The millicode routine can be thought of as a sub-routine/function. The millicoded routine is entered via a "millicode entry" (mcentry) instruction and exited by a "millicode end" (mcend) instruction. These mcentry and mcend instructions are processed as branch instructions and are carefully treated to allow these entry (mcentry) and exit (mcend) instructions to be branch predicted.

Figure 2:
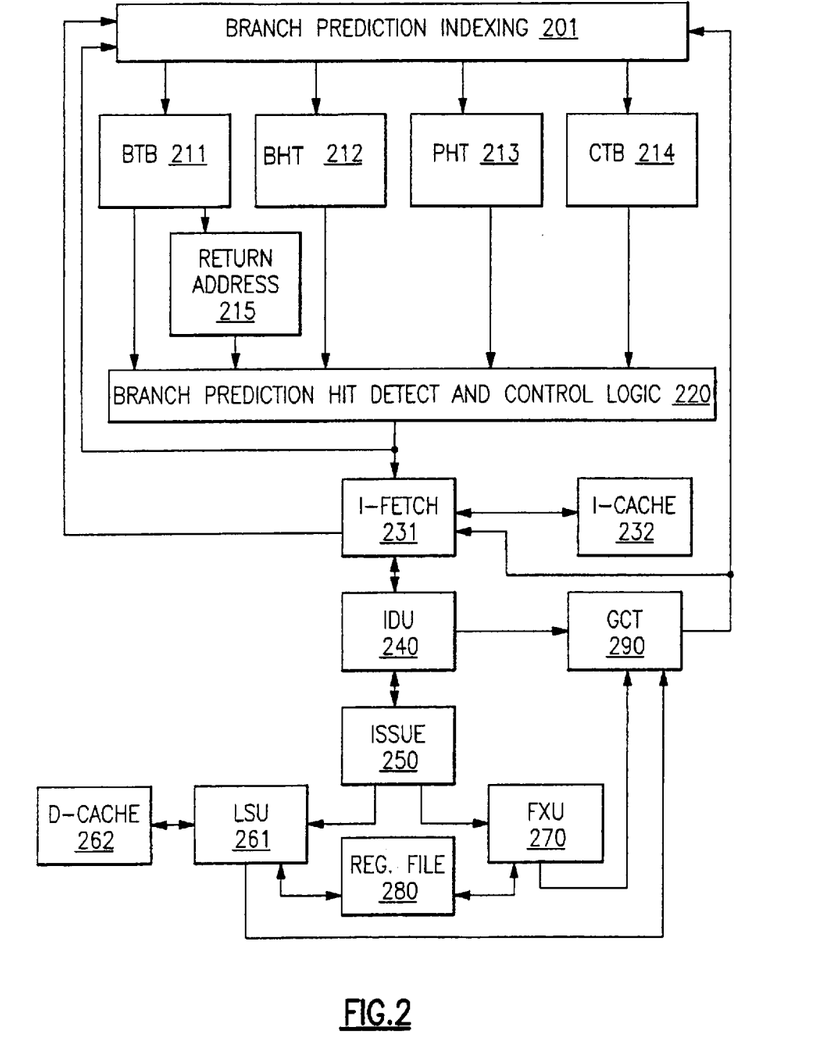
FIG. 2 illustrates branch prediction and how it interfaces with the computing system's processor pipeline.

FIG. 2 shows a high level view of branch prediction and how it interfaces with a processor pipeline. Branch prediction may consist of multiple parts. A branch history table (BHT) is used to predict the direction (taken vs not taken) of a branch and a branch target buffer (BTB) predicts the target of a branch based on a given instruction address (IA) associated with that branch. The BTB holds branch information for branch prediction, and the branch information includes a branch address. The system also includes search logic for searching the BTB to locate a branch address. There may be other prediction mechanisms such as a pattern history table (PHT) to assist the BHT and a changing target buffer (CTB) to assist the BTB.

Figure 4:
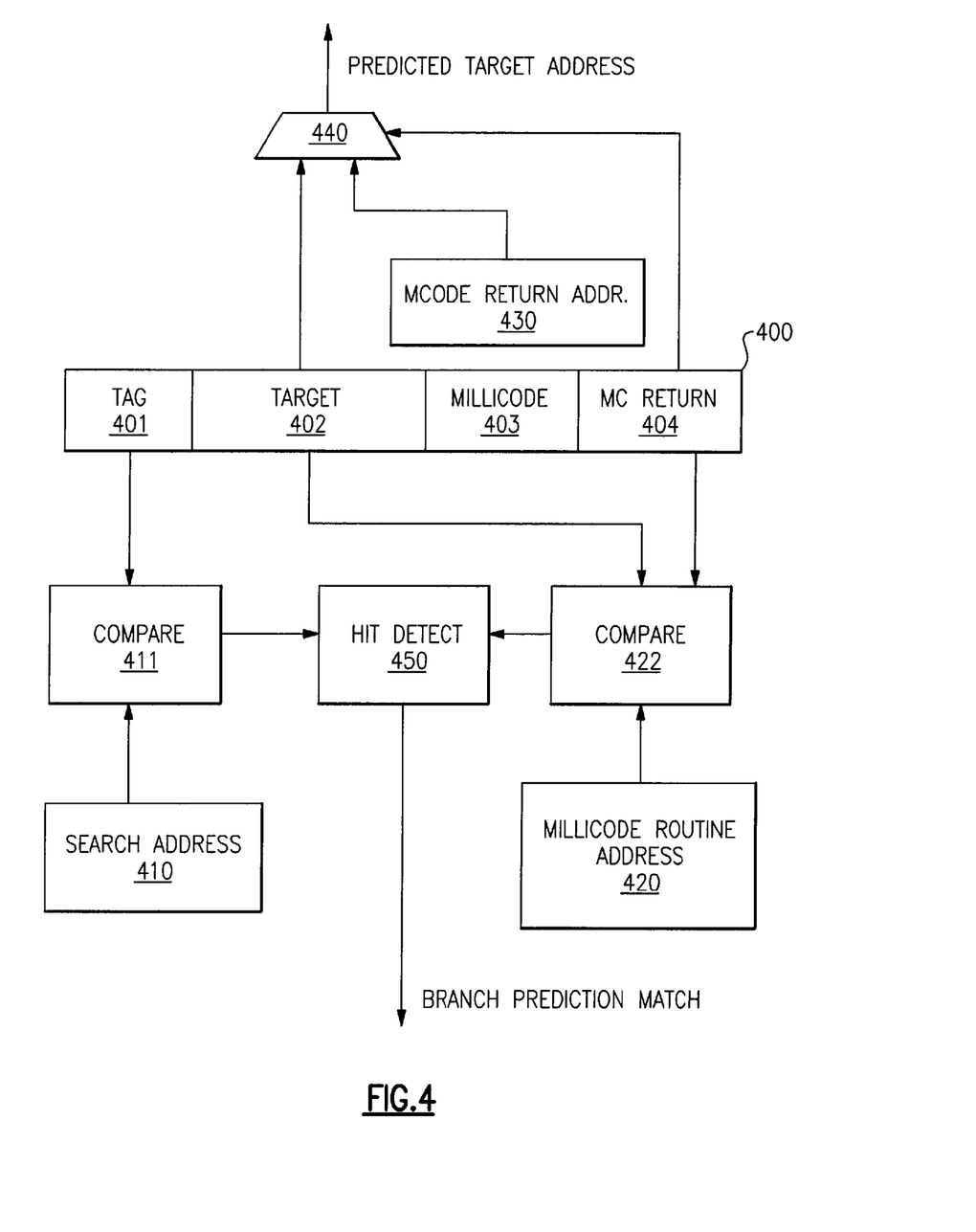
FIG. 4 illustrates a branch target buffer's (BTB) target address selection.

There are 5 parts defined for branch prediction in the BTB (211) which predicts the address, target and other bits about a branch. Other items include but are not limited to the branch being in millicode and the branch being for the millicode return (mcend) instruction. This is also defined in the anti-aliasing bit (403) and the millicode return branch instruction denotation (404) discussed below. The direction (taken & not taken) prediction as a function of the branch address is predicted by the BHT (212). To handle branches which exhibit direction outcome as a function of what path was taken to get to the branch, the PHT (Pattern History Table-213) is present. Should a branch have more than one target, the multiple targets can be handled by one of two items, CTB (Changing Target Buffer-214) and the return address (215). In our exemplary computing system, the return address is only used to handle the return address for a millicode routine as per a mcend (which would be termed a call-return stack in another micro-architecture implementation). The structures are accessed in parallel as shown in FIG. 2; however, one could design the structures to be accessed in a non-parallel way as to decrease performance in the trade-off of reducing power also. Upon getting a prediction out of the branch prediction (detection by 220), that content is used for two purposes. One purpose is to re-index the branch prediction logic (220 -->201) to search for the next branch. Also, the branch prediction is sent to the I-fetch logic. Should the branch have been predicted taken, then the I-fetch will start fetching down the predicted target address path.

I-fetching (instruction fetch unit 231) fetches from the L1 I-cache (232). While not specifically detailed in FIG. 2, if a miss happens in the L1 I cache, then a fetch is made from a level of cache storage further away from the processor. This higher level of storage can either be another level of cache or main memory. Upon acquiring the instructions being fetched for, they are sent to the instruction decode unit (IDU 240) for decode. The IDU will send the instructions to the Issue queue (250) which determines when the instructions can be sent to the load store unit (LSU 261) or fixed point unit (FXU 270) for performing the action defined by the instruction. Depending on the machine design, instructions can either be issued in-order or out-of-order. If the instruction is a load/store, the instruction is sent to the LSU (261) upon which the LSU will access the D-cache (262) with respect to memory content. It may also access locally architected registers as it forms/acquires the address for which it is to fetch for. The FXU handles operations on register manipulation. The results from both the LSU (261) and FXU (270) are sent to the GCT (Global Completion Table-290). The GCT tracks when instructions are completed and can be architecturally checkpointed. Upon a branch wrong resolution, the knowledge of a restart must be passed along to the branch prediction logic (201) so as to update the branch prediction table states. It may update anywhere from zero to all of the tables (211, 212, 213, 214, 215).

Figure 3:
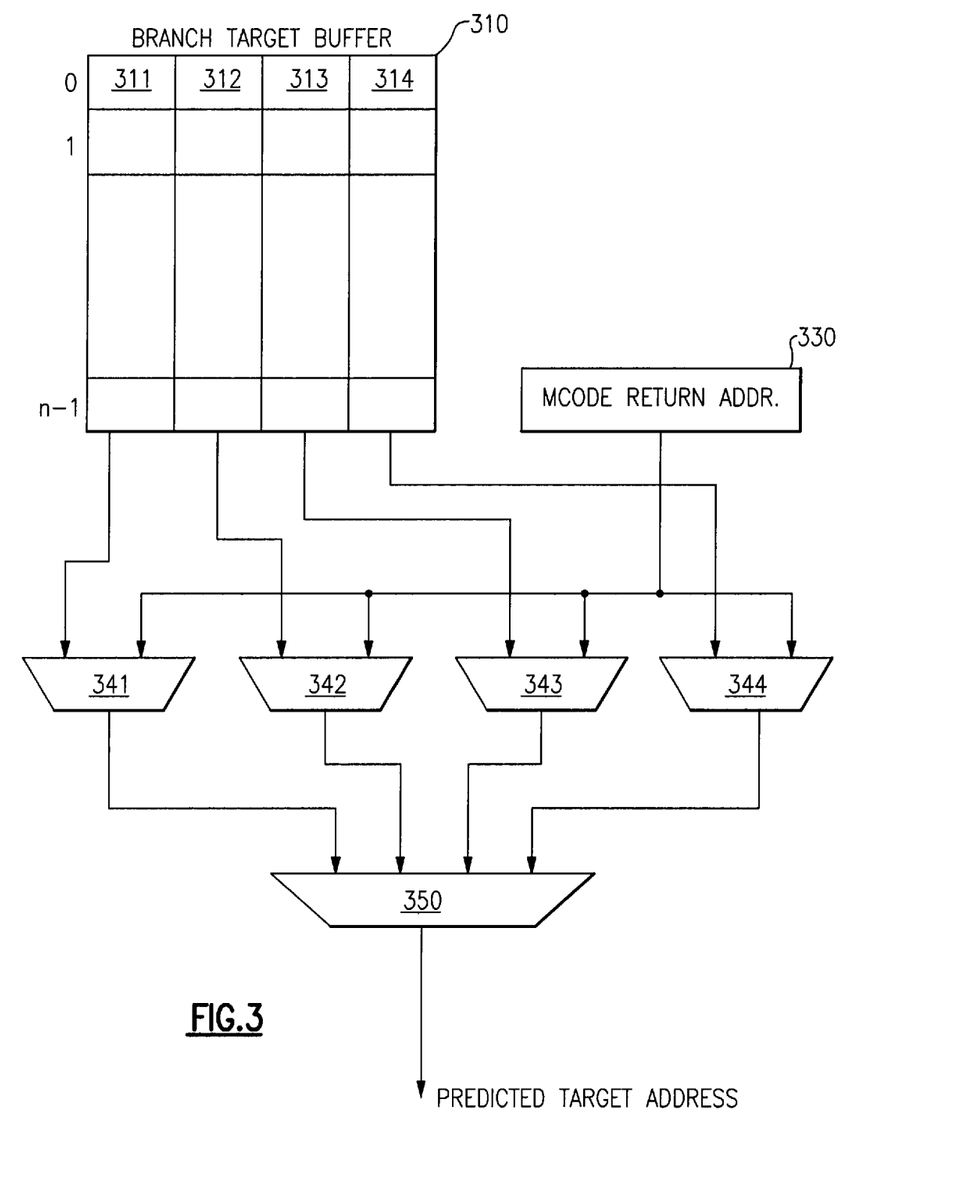
FIG. 3 shows the predicted branch's target address dataflow.

The basis for prediction in our exemplary embodiment is built around the foundation of a BHT and BTB. FIG. 3 shows the predicted branch's target address dataflow. This FIG. 3 shows the BTB (310) containing 4 sets of data (311, 312, 313, 314) upon which a target can be predicted from any of the 4 BTB sets. Each set has the potential of stating the target address of the branch as that of the address contained in the BTB or that which is stored in the millicode return address storage container (330). Upon determining which address is to be used per BTB set with respect to predicting a branch target, the BTB (310) must have its output muxed (350) down to a single branch chosen as the next branch in program order. The selection of BTB target (311, 312, 313, 314) vs millicode return address (330) is shown in FIG. 4.

FIG. 4 illustrates a branch target buffer's (BTB) target address selection steps. Per a given BTB entry (311, 312, 313, 314) multiple blocks of data are stored with each entry. In FIG. 4, the block entry 400 references the block of addresses (401, 402, 403, 404). The BTB entry (400) contains at minimal a branch tag address (401), a predicted target address for the given branch (402) and knowledge if the branch is in millicode (403). If millicode is kept to a region that is fully covered by the branch tag address (401), then having a millicode bit (403) prevents aliasing from occurring such that any branch predicted in millicode actually has a branch at that address.

Here we observe the effect of aliasing. Unlike the Icache/Dcache, a full tag is not used on the BTB for doing so only yields a delta on performance. The BTB for user code is for performance and making a bad prediction will only alter performance. In a trade-off of area, there is a balance on how many tag bits exist versus the total number of BTB entries. The more tag bits, the fewer total BTB entries. Certain code such as millicode needs to have more control over branch prediction and by including a millicode bit, the prevention of aliasing as defined for millicode is a small subset of space which can be covered by the limited BTB tagging.

Note that in FIG. 4, also included in the BTB entry is the millicode return branch instruction denotation (404). While these are the required fields of BTB in this description, to one skilled in the art, there may be other content also stored in the BTB. For that matter, there are many other bits in the BTB on the System z microprocessor (past, present, and future).

The creation of the millicode return address (430) Millicode can be thought of as a function. Upon a complex instruction being called by a user program, the hardware branches somewhere in secure memory to do a number of simpler instructions which define the millicode instruction. Upon completion of the millicode routine, the millicode can be thought of as branching back to the user code. A branch to the millicode routine and returning back to the user code can be thought of as a branch to a function/sub-routine and then a return back. Upon a branch into the millicode routine, the sequential address to that of the millicoded routine entry instruction is saved off in the millicode return address (430). This is the target of the branch that returns from millicode to user code. This yields better performance, for that millicode routine can be called from many different places in user code and hence it does not have a single point of return. Since the millicode return address is saved off (430), the target field (402) of a BTB entry (400, 311, 312, 313, 314) is no longer in use.

Based on the operation of the millicode routine, there are certain routines which must prevent the millicode return from being predicted. For example, there are certain routines within an O/S which purge address translations from the TLB and/or part of the Icache/Dcache (232, 262). During such purging actions, for example, the cache must not take a miss while in the middle of redefining its state as the miss would go after modifying the cache state which is currently in the middle of being modified by another [purge] process. Now within millicode, there can be two different millicode instructions/functions which have a common sub-routine. One millicode function may allow for the mcend to be predicted while the other routine can not allow the millicode routine's mcend to be predicted. To handle this, since there is one unique mcend as per instruction address, the address of the millicode routine itself is stored in the target address field (402) of the BTB entry. Once again, the amount of millicode space is limited/finite and as such will fit in the target field.

Upon determining if a search yields a branch hit, not only is the tag address (401) for the BTB entry (400) compared (411) to the search address (410), but if that particular BTB entry (400) is also a mcend (404), then the millicode routine address (420) must also be compared (422) to the contents stored in the BTB entries (400) target address field (402) as the target address field does not contain the target of the branch but rather the millicode routine that was called by the program. In order for there to be a branch match, an equality must be recognized on the tag compare (411) and either the branch must not be a mcend (404) or the target field (402) must match (422) the millicode routine address (420). If both of the conditions are satisfied (450), then a branch is found in the given BTB entry (400).

It will be seen that a BTB works by storing a partial branch address and target address in a table A partial branch address tag is only required for the BTB because being incorrect is not a data integrity issue but rather a performance trade-off. With a finite amount of area on the chip for a BTB (to provide enough silicon area to optimize overall performance) a trade-off has to be made between the number of branch address tag bits and total number of branches which are stored in the BTB.

The IBM System z10™ Enterprise Class, is the current commercial machine which offers a continuation of IBM scalable mainframe servers which can implement the inventions of the referenced US Published Patent Application entitled: SYSTEM AND METHOD FOR PROVIDING ASYNCHRONOUS DYNAMIC MILLICODE ENTRY PREDICTION, filed by James J. Bonanno, et al. on Feb. 21, 2008 and the referenced U.S. Published Patent Application entitled: SYSTEM AND METHOD FOR SEARCH AREA CONFINED BRANCH PREDICTION, filed by James J. Bonanno et al., Feb. 22, 2008 are included in our exemplary embodiment of the computer system 130 as well as the present advance when the new architected millicode control is implemented. Both of these published applications are referenced and incorporated in full herein by this reference. Based on the newer machines use of a table which is 4-way set associative and has an index which is offset by 32 bytes; therefore, for each address that is used to index the BTB, 32 bytes of content can be searched to determine if there a stored branch address in one of the 4-sets. Upon a branch instruction address match, the branch is predicted and the instruction fetch (I-fetch) logic fetches down the target path of the branch. This can all be done prior to execution, decode, and "I-fetch to I-cache" for the given branch instruction.

While in millicode, updates to the machine can include updating the TLB (translation lookaside buffer). Upon doing such updates, fetches must be controlled as to not allow I-cache misses which require translation Millicode can control the routine itself by fetching all cache lines required to this process and then verifying that all fetches have completed successfully Millicode can not control the program outside of the millicode routine and hence millicode must prevent the mcend from yielding a fetch to outside of the millicode while performing such operations. To prevent such mcend target fetches, items already in place/existence include:

(I) A bit in the BTB to state that a given branch is a millicode branch. With this bit, an alias is prevented in millicode for the millicode region is small enough to fit into the available branch address tags. Through this, the BTB can only predict actual paths that have been executed/completed by the millicode routine in the past.

(II) A bit in the mcend opcode that states a given mcend routine is allowed or not allowed to be predicted. By preventing an mcend from being predicted, it is never installed into the BTB and thus can never be predicted by the BTB.

The problem solved with the current advance illustrated by the Figures is that within millicode that still exists is subroutine calls and this can yield a mcend prediction that is desired in some cases but can not be supported in other cases . For example, consider millicode routines 'A' & 'B'. Each of these routines calls subroutine 'X'. Initially millicode routine 'A' is executed and it calls subroutine 'X'. Eventually sub-routine 'X' returns back to routine 'A' and 'A' eventually has a mcend which exits the millicode routine. The mcend in routine 'A' is to be predicted for there are no data integrity issues here and performance is to be optimized.

The problem comes with routine 'B' which is updating sensitive states of the machine and must prevent mcend from being predicted. Routine 'B' is entered and it also needs to use sub-routine 'X'. When subroutine 'X', from Routine 'B', it is predicted. However, to go back to routine 'A' (instead of routine 'B') since the last time it went back to 'A'.

Routine 'A' has an mcend that is allowed to be predicted and the mcend for routine 'A' is then predicted even though the routine being processed is routine 'B'. While routine 'A' results are never committed (since it will eventually get a wrong target prediction notification on the return from routine 'X'), routine 'A' has the mcend predicted which allows an instruction fetch to proceed beyond the mcend and this may create data integrity for routine 'B'.

Figure 5:
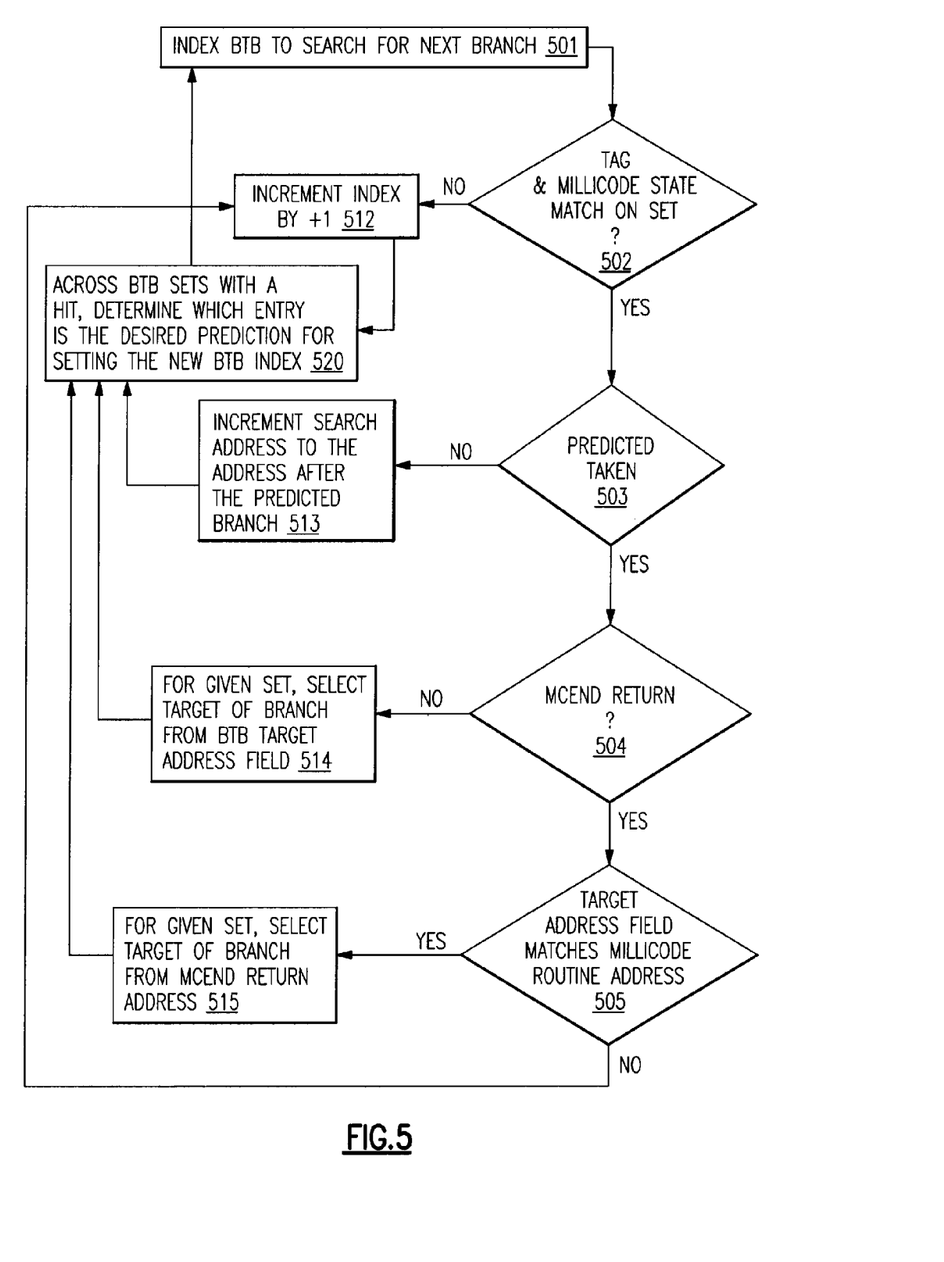
FIG. 5 illustrates finding a predicted branch.

Thus FIG. 5 illustrates finding a predicted branch. A BTB index is available for searching (501) so index the BTB (310). If there is a tag match, which includes the millicode bit (403), a branch is found in the given BTB set (311, 312, 313, 314). If no match was found, then continue the sequential search through the instruction address field by performing an increment to the BTB index (512). The output of 512 couples to a hit point (520). So a compare (502) is for a given set. Only if all sets don't find a hit, does the BTB index get an increment by the value of 1. Then, start the process again (501). If there is a tag match determine the direction (503) of the prediction. If the branch is predicted not taken then create (513) a side copy of the search address, of which a subset is used for the index, to represent the address of the instruction sequentially after the not taken branch. If the branch is taken, then it must be determined (504) if the branch is a mcend. If the branch is not a mcend, then the target address is that in the BTB target field (514). If the branch is a mcend, then a compare (505) must be and is done on the target address field (402) versus the millicode routine address (420).

If the target address field (402) matches the millicode routine address, then the target address should be selected (515) from the saved off millicode return address (430). If there is not a match then as per this set, the BTB is to increment to the next line to continue the search (512).

Upon determining if a hit has taken place for each and every set, there may be anywhere from 0 to all sets finding a hit (520). If no hit is found, then the BTB is to search the next line. If there is one hit, that is the hit of interest. If there are multiple hits, then the hit of interest to use for starting the next search is that entry which lies closest to but not prior to the starting search address. This decision of the new BTB index is defined in 520.

Thus, the solution we have invented for this problem is to correlate mcend predictions with specific millicode routines. In this sense, mcend predictions in routine 'A' can only be predicted if the mcentry was for routine 'A'. The same is true for routine 'B'. In this fashion, should routine 'X' have a mcend, then this mcend would need a unique entry in the BTB for each millicode routine that referenced the 'X' mcend.

While the illustrated implementation of the invention is being shown implemented with respect to the hardware, this invention can also be used as a way of correlating mcends to given millicode routines.

The mcends are mapped in the Branch Target Buffer (BTB) to a specific millicode routine by storing the mcentry opcode in the mcend's BTB entry.

Branch prediction predicts the direction and the target of a branch. A Branch History Table (BHT) is used to predict that direction (taken vs not taken) for a branch while a Branch Target Buffer (BTB) is used to predict the target of a branch.

Stored within the BTB besides a branch target address is a branch address tag. The branch address tag works similar to a cache directory except a BTB tag does not have to be 100% precise as the BTB is a performance feature which is allowed to be wrong. There is a trade-off on the number of tag bits versus the number of overall entries stored within the BTB as the BTB only has so much physical area on a core/chip that it can occupy.

Processing millicode entry/end routines is very similar to a call -return stack except that millicode routines can not be nested and there is a limit to the number of millicode routines that can be in flight in the pipeline at any time. For these reasons, the mcend return address does not need to be stored in the BTB but rather a single bit needs to be stored in the BTB which states that the particular entry in the BTB is for a branch which is a "mcend". On a mcentry, the sequential instruction address can be stored in a millicode call-return stack and hence on a mcend prediction, the target address can be pulled from this stack.

Given this behavior, this now frees up the target address field in the BTB which can be used for another purpose.

There is and always will be a finite number of millicode instructions defined in the architecture for the microprocessor and the number of millicode instructions is smaller than the number of target bits that need to be stored in the BTB. This allows a substitution that for every mcend, instead of storing the target address, the target field stores the mcentry opcode with which the mcend is associated.

Upon entering a millicode routine, the BTB acquires knowledge and remembers which millicode routine has been entered. Upon a mcend prediction, the mcend prediction is only valid if the target field contains the opcode of the mcentry that matches with the mcentry routine that is currently being processed. This means, mcends associated with a given millicode routine are the only set of mcends allowed to be predicted for a given millicode routine.

In accordance with an exemplary implementation of the invention:

(i) Branches are installed into the BTB at completion time frame for an instruction.

(ii) Only one millicode routine per thread can be issued in the processor pipeline at any one time frame.

_ Other details of the invention have been stated above in our discussion of way of correlating mcends to given millicode routines.

Upon issuing a millicode routine in the processor pipeline as per the mcentry instruction, the given opcode of the mcentry is stored away within the pipeline and is held onto throughout the entire execution of the given millicode routine. Upon executing the mcend instruction, it can be recollected as to which millicode routine it is associated with. When the mcend is completed, not only will the mcend be placed into the BTB (given other constraints are met and the mcend is not already in the BTB) with the branch address tag, and millicode state descriptor bit, but the mcentry opcode it is associated with will also be entered into the BTB. With the mcend now in the BTB, it can be predicted in the future.

On future operations of a millicode routine, once again the given opcode of the mcentry is stored away within the pipeline and is held onto throughout the entire execution of the given millicode routine. When a mcend is found in the BTB while searching for branch prediction within the millicode routine, the mcentry opcode stored with the mcend is compared to the opcode of the mcentry that was stored away upon entry into the given millicode routine. If these two opcodes match then the mcend is allowed to be predicted.

Should these opcodes not match, then the given mcend potential prediction is not valid and no prediction is made on the mcend, with a branch address tag match, found within the BTB.

A computer program and/or millicode which embodies a process described herein is stored on at least one program storage device readable by a machine, tangibly embodying at least one program of instructions executable by the machine to perform the capabilities of the present invention can be provided and used to implement the invention.

The diagrams depicted herein are just examples. There may be many variations to these diagrams or the steps (or operations) described therein without departing from the spirit of the invention. For instance, the steps may be performed in a differing order, or steps may be added, deleted or modified according to the order of importance of the heuristic steps, in order to perform the described functions. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer processing system, comprising:
   a computer processing system apparatus having a processor employing an operating system (O/S) multi-task control between multiple user programs able to use millicode routines and which computer processing system is to ensure that the multiple user programs do not interfere with each other, and a processor pipeline for handling said millicode routines; and
   a branch addressing mechanism limiting millicode routine end branch prediction, using millicode instructions for branch prediction which predicts a branch direction and a branch target of a branch for instructions of said processor pipeline, having a branch target buffer (BTB) predicting the branch target for a millicode routine entered via a "millicode entry" (mcentry) instruction and exited by a "millicode end" (mcend) instruction processed as branch instructions, and a correlation mechanism for predicting millicoded branch mcentry and mcend instructions and for correlating mcend predictions with specific millicode routines, wherein the correlating comprises comparing a value of a target address field with a millicode routine address, based on an indication of an mcend return, the target address field comprising an address associated with a millicode routine; and
      based on the value of the target address field matching the millicode routine address, which indicates a correlation of the mcend instruction to the mcentry instruction, branch predicting a target address of the mcend instruction and performing fetching at the target address of the mcend instruction; and
      based on the value of the target address field not matching the millicode routine address, continue searching the BTB.

2. The computer processing system according to claim 1, wherein millicode can not control a program of the multiple user programs outside of the millicode routine and said branch addressing mechanism prevents mcends not associated with the millicode routine from yielding a fetch to outside of a current millicode routine while performing such operations as required by said millicode routine.

3. The computer processing system according to claim 2, wherein said mcends are mapped in the BTB to a specific millicode routine by storing the mcentry opcode in the mcend's BTB entry.

4. The computer processing system according to claim 3, wherein branches are installed into the BTB at a completion time frame for an instruction of said millicode routine.

5. The computer processing system according to claim 3, wherein only one millicode routine can be issued in the processor pipeline at any one time frame.

6. The computer processing system according to claim 5, wherein based on entering a millicode routine with a mcentry routine, the BTB acquires knowledge and remembers which millicode routine has been entered in said processor pipeline, and wherein, based on a mcend prediction, the mcend prediction is only valid if the target field contains the opcode of an mcentry that matches with the mcentry routine that is currently being processed, wherein mcends associated with a given millicode routine are the only set of mcends allowed to be predicted for said given millicode routine.

7. The computer processing system according to claim 6, wherein based on entering a millicode routine with a mcentry routine a BTB address tag bit in the BTB states that a given branch is a millicode branch wherein, with this BTB address tag bit, an alias is prevented in millicode as the BTB address tagged bit branch region is small enough to fit into the available branch address tags, wherein the BTB can only predict actual paths that have been executed/completed by the millicode routine in the past.

8. The computer processing system according to claim 7, wherein based on entering a millicode routine with a mcentry routine, an address tag opcode bit in the mcend opcode states a given mcend routine is allowed or not allowed to be predicted, wherein when not allowed a mcend is prevented from being predicted, it is never installed into the BTB and thus can never be predicted by the BTB.

9. The computer processing system according to claim 8, wherein a branch history table (BHT) is used to predict that direction (taken vs not taken) for a branch while a branch target buffer (BTB) is used to predict the target of a branch.

10. The computer processing system according to claim 9, wherein stored within the BTB besides a branch target address is said BTB address tag.

11. A method for computer processing system control using a processor having operating system (0/S) multi-task control between multiple user programs, comprising:
    enabling said processor to use millicode routines when said computer processing system control is to ensure that the programs do not interfere with each other; and
    employing a branch addressing mechanism, using millicode instructions for branch prediction which predicts a branch direction and a branch target of a branch for instructions of a processor pipeline, said branch addressing mechanism having a branch target buffer (BTB) predicting a branch target for a millicode routine as said millicode routine entered via a "millicode entry" (mcentry) instruction and exited by a "millicode end" (mcend) instruction is processed as branch instructions, said branch addressing mechanism including a correlation mechanism for predicting millicoded branch mcentry and mcend instructions and for correlating mcend predictions with specific millicode routines, wherein the correlating comprises comparing a value of a target address field with a millicode routine address, based on an indication of an mcend return, the target address field comprising an address associated with a millicode routine; and based on the value of the target address field matching the millicode routine address, which indicates a correlation of the mcend instruction to the mcentry instruction, branch predicting a target address of the mcend instruction and performing fetching at the target address of the mcend instruction; and based on the value of the target address field not matching the millicode routine address, continue searching the BTB.

12. The method according to claim 11, wherein millicode can not control a program of the multiple user programs outside of the millicode routine and said branch addressing mechanism prevents mcends not associated with the millicode routine from yielding a fetch to outside of a current millicode routine while performing such operations as required by said millicode routing.

13. The method according to claim 12, wherein said mcends are mapped in the BTB to a specific millicode routine by storing the mcentry opcode in the mcend's BTB entry.

14. The method according to claim 13, wherein branches are installed into the BTB at a completion time frame for an instruction of said millicode routine.

15. The method according to claim 13, wherein only one millicode routine can be issued in the processor pipeline at any one time frame.

16. The method according to claim 15, wherein based on entering a millicode routine with a mcentry routine, the BTB acquires knowledge and remembers which millicode routine has been entered in said processor pipeline, and wherein, based on a mcend prediction, the mcend prediction is only valid if the target field contains the opcode of an mcentry that matches with the mcentry routine that is currently being processed, wherein mcends associated with a given millicode routine are the only set of mcends allowed to be predicted for said given millicode routine.

17. The method according to claim 16, wherein based on entering a millicode routine with a mcentry routine a BTB address tag bit in the BTB states that a given branch is a millicode branch wherein, with this BTB address tag bit, an alias is prevented in millicode as the BTB address tagged bit branch region is small enough to fit into the available branch address tags, wherein the BTB can only predict actual paths that have been executed/completed by the millicode routine in the past.

18. The method according to claim 17, wherein based on entering a millicode routine with a mcentry routine, an address tag opcode bit in the mcend opcode states a given mcend routine is allowed or not allowed to be predicted, wherein when not allowed a mcend is prevented from being predicted, it is never installed into the BTB and thus can never be predicted by the BTB.

19. A computer millicode control coded program, comprising a plurality of instructions stored on at least one non-transitory program storage device readable by a machine, tangibly embodying at least one program for controlling the execution of instructions executable by a computer to perform the steps of:

enabling said processor to use millicode routines when said computer processing system control is to ensure that the programs do not interfere with each other; and employing a branch addressing mechanism, using millicode instructions for branch prediction which predicts a branch direction and a branch target of a branch for instructions of a processor pipeline, said branch addressing mechanism having a branch target buffer (BTB) predicting a branch target for a millicode routine as said millicode routine entered via a "millicode entry" (mcentry) instruction and exited by a "millicode end" (mcend) instruction is processed as branch instructions, said branch addressing mechanism including a correlation mechanism for predicting millicoded branch mcentry and mcend instructions and for correlating mcend predictions with specific millicode routines, wherein the correlating comprises comparing a value of a target address field with a millicode routine address, based on an indication of an mcend return, the target address field comprising an address associated with a millicode routine; and based on the value of the target address field matching the millicode routine address, which indicates a correlation of the mcend instruction to the mcentry instruction, branch predicting a target address of the mcend instruction and performing fetching at the target address of the mcend instruction; and based on the value of the target address field not matching the millicode routine address, continue searching the BTB.

20. The computer millicode control coded program according to claim 19, wherein millicode can not control a program of the multiple user programs outside of the millicode routine and said branch addressing mechanism prevents mcends not associated with the millicode routine from yielding a fetch to outside of a current millicode routine while performing such operations as required by said millicode routine.

* * * * *